United States Patent [19]

Vogt et al.

[11] Patent Number: 4,824,451
[45] Date of Patent: Apr. 25, 1989

[54] MELT-BLOWN FILTER MEDIUM

[75] Inventors: Clifford M. Vogt, Roswell; Peter W. Shipp, Jr., Woodstock, both of Ga.

[73] Assignee: Kimberly-Clark Corporation, Neenah, Wis.

[21] Appl. No.: 99,283

[22] Filed: Sep. 21, 1987

Related U.S. Application Data

[63] Continuation of Ser. No. 815,478, Dec. 31, 1985, abandoned.

[51] Int. Cl.$^4$ .............................................. B01D 39/16
[52] U.S. Cl. ........................................ 55/528; 55/500; 156/167
[58] Field of Search .......................... 55/528, 500, 527; 156/167

[56] References Cited

U.S. PATENT DOCUMENTS

| | | | |
|---|---|---|---|
| 2,988,469 | 6/1961 | Watson | 154/101 |
| 3,231,639 | 1/1966 | Mabru | 264/12 |
| 3,755,527 | 8/1973 | Keller et al. | 156/167 |
| 3,825,380 | 7/1974 | Harding et al. | 425/72 |
| 3,849,241 | 11/1974 | Buntin et al. | 161/169 |
| 3,888,610 | 6/1975 | Brackmann et al. | 425/72 |
| 3,972,759 | 8/1976 | Buntin | 156/167 |
| 4,011,067 | 3/1977 | Carey | 55/354 |
| 4,018,646 | 4/1977 | Ruffo et al. | 162/146 |
| 4,032,688 | 6/1977 | Pall | 428/36 |
| 4,100,324 | 7/1978 | Anderson et al. | 156/167 |
| 4,116,738 | 9/1978 | Pall | 156/167 |
| 4,181,513 | 1/1980 | Fukuda et al. | 55/316 |
| 4,211,661 | 7/1980 | Perry | 210/491 |
| 4,215,682 | 8/1980 | Kubik et al. | 128/205.29 |
| 4,375,718 | 3/1983 | Wadsworth et al. | 29/592 |
| 4,431,545 | 2/1984 | Pall et al. | 210/641 |
| 4,526,733 | 7/1985 | Lau | 264/12 |

Primary Examiner—Charles Hart
Attorney, Agent, or Firm—William D. Herrick

[57] ABSTRACT

HEPA or pre-HEPA filter media are made by forming a web of melt-blown polypropylene fibers. The melt-blown process is accomplished at a low through-put of about 1 pound per inch of die width per hour and at a high fluid flow rate of about 250 to 325 standard cubic feet per minute. The resulting web has fibers with an average diameter of about 5 microns and surface pores of less than 30 microns in size. By cold calendering the web with pressure of between 100 and 300 psi, further filter efficiency can be achieved. The resulting calendered web has surface pore sizes less than 20 microns.

1 Claim, 3 Drawing Sheets

MELT-BLOWN FILTER MEDIUM

This is a continuation of co-pending application Ser. No. 06/815,478 filed on 12/31/85, now abandoned.

BACKGROUND OF THE INVENTION

This invention relates generally to filter media and more particularly concerns melt-blown filter media for use in HEPA and pre-HEPA filters.

A HEPA filter has a filtration efficiency of at least 99.97% to 0.3 micron particles. The efficiency of HEPA filters is measured in accordance with test procedures described in Military Standard 282, Test Method 102.1, using dioctylphthalate particles that average 0.3 micron at a face velocity of 10.4 to 10.5 feet per minute. The efficiency of the filter refers to the percentage of particles that are filtered out of the air stream by the HEPA filter. Filters are classified as HEPA only if they achieve the requisite 99.97% filtration efficiency. Filters having efficiencies from about 90 to 99.97% are referred to as pre-HEPA filters.

HEPA and pre-HEPA filters are used to filter air in clean rooms where integrated circuits and precision equipment are manufactured. HEPA and pre-HEPA filters are also used in filtering air for operating rooms to filter out bacteria and other contaminants which may be present in the air and harmful to patients.

Not only must HEPA and pre-HEPA filters provide the requisite filter efficiency, it is likewise important that the pressure drop across the filter be maintained as low as possible for a given filter efficiency. If the pressure drop becomes excessive across the HEPA or pre-HEPA filters, larger more powerful fans will be required to compensate for the excess pressure drop with the resulting increase in power and noise. Therefore, it is important that HEPA and pre-HEPA filters maintain the lowest possible pressure drop at a given efficiency rating.

Typically HEPA and pre-HEPA filter media are produced from glass filaments which filaments range in size from 0.3 to 2.0 microns. Glass filter media are formed in sheets by a wet (papermaking) process. In order for glass fiber HEPA and pre-HEPA filters to perform at the requisite efficiencies, the filament sizes must be small to yield pore sizes within the filter that are sufficiently small to assure that the 0.3 micron particles do not pass through the filter media. Because the wet process for making glass filter media is both time consuming and expensive, melt-blown materials appear to offer attractive possibilities for making filter media and perhaps HEPA and pre-HEPA filter media.

The melt-blown process is well known and is described in various patents and publications, including NRL Report 4364, "Manufacture of Super-Fine Organic Fibers" by V. A. Wendt, E. L. Boon, and C. D. Fluharty; NRL Report 5265, "An Improved Device for the Formation of Super-Fine Thermoplastic Fibers" by K. D. Lawrence, R. T. Lukas, and J. A. Young, and U.S. Pat. No. 3,849,241 issued Nov. 19, 1974, Buntin, et al.

Melt-blown materials made in accordance with conventional practice for use as wiping cloths and the like have been found to be useful as filter media, but such filter media generally have efficiencies well below 70%.

Buntin et al. U.S. Pat. No. 3,849,241 discloses a process for making melt-blown polypropylene mats which are said to be useful as filter media. The melt-blown process disclosed illustrates the inter-relationships between the apparent viscosity of the resin, the resin flow rate, and the gas flow, with particular emphasis on the elimination of shot by lowering the apparent viscosity of the resin. The process is said to produce mats having fibers with diameters from 0.5 micron to 5 microns and usually from 1.5 microns to 4 microns. There is no disclosure, however, that the resulting mats will perform as HEPA or pre-HEPA filter media.

Pall U.S. Pat. No. 4,032,688 discloses a continuous production process for making non-woven thermoplastic webs in cylindrical or sheet form, which webs are useful as filter elements. The webs disclosed are of melt-blown polypropylene and are deposited on a mandrel to form a cylindrical filter element. A sheet is made by drawing the cylindrical web off of the end of the mandrel and flattening it between rollers. The fiber diameters are disclosed to be less than 10 microns and preferably less than 5 microns in diameter. The melt-blown process of Example 1 is carried out by extruding polypropylene at a rate of 1.1 lbs. per inch of die width per hour with air flow (11 to 16 psi) adjusted to produce a fiber of 4 microns in diameter. The resulting filter medium is said to have a uniform pore size of 15 microns, but the resulting filter media do not appear to be HEPA or pre-HEPA filter media.

Perry U.S. Pat. No. 4,211,661 discloses a filter medium of spun-bonded polypropylene laminated to a melt-blown polypropylene sheet which filter element is used as a particle filter for filtering liquid coolant. The melt-blown polypropylene forms the downstream side of the substrate and provides a thin fibrous downstream layer capable of retaining and filtering fine particles, particularly fine metal particles.

Fukuda et al. U.S. Pat. No. 4,181,513 discloses an absorptive filter material having deodorizing, degassing, and decolorizing properties. The reinforcing sheet used in connection with the filter may be comprised of polypropylene fibers and is said to have dust-collection efficiencies of not less than 60%. There is no specific disclosure, however, of the polypropylene melt-blown material or its efficiencies as a filter element in the Fukuda et al. patent.

Wadsworth et al. U.S. Pat. No. 4,375,718 discloses a process for manufacturing an electrostatically-charged filter medium. The fibers in the filter medium may be polypropylene and may be formed by melt-blowing techniques. The melt-blown fiber sizes are disclosed to be from 0.3 to 5 microns in diameter. The melt-blown filter medium is then plied on either side with a contact web having specific electrical properties which will accept an electrical charge. The contact webs are made from cotton, rayon, or mixtures of cotton and rayon with wood pulp or other fibers such as hemp. The filter medium, however, has a low efficiency (58%) when used without an electrical charge.

Kubik et al. U.S. Pat. No. 4,215,682 discloses a melt-blown fibrous electret which is continuously formed by passing melt-blown fibers through an electrical field upon exit from a die tip. The resulting web is said to then possess a permanent charge. Examples 1-8 disclose melt-blown micro-fibers prepared from polypropylene which are 25 microns or less in average diameter. It appears that the resulting electrostatically-charged filter media have efficiencies of up to 68%, but the same material with no charge only is 45% efficient.

Carey U.S. Pat. No. 4,011,067 discloses a filter medium produced from either melt-blown or solutionblown micro-fibers. The filter medium is a plied medium having a base porous web, an intermediate layer of micro-fibers, and a top porous web. The outside layers contribute only a minor portion, normally less than 20% of the pressure drop, and are typically non-woven fibrous webs such as polyethelene terephthalate. The intermediate layer of micro-fibers is of sufficient thickness to produce a HEPA filter which will typically exhibit a pressure drop on the order of 3 to 4 inches of water at a face velocity of 50 feet per minute.

The prior art thus fails to disclose an uncharged, melt-blown polypropylene material which is useful as a HEPA or pre-HEPA filter medium.

SUMMARY OF THE INVENTION

It is therefore the principal object of the present invention to provide a pre-HEPA filter medium of melt-blown polypropylene material which filter medium has a range of efficiencies at pressure drops similar to glass fiber filters of similar efficiencies.

In order to achieve the foregoing objective, an improved melt-blown material is formed by lowering the through-put of the melt-blown extruder from a conventional rate of about 4 to 5 pounds per inch of die width per hour (PIH) of polypropylene to about 1 PIH and increasing the amount of fluid used in attenuating and breaking up the polymer stream from a conventional rate of about 100 to 150 standard cubic feet per minute (SCFM) to about 250 to 325 SCFM. (Standard cubic feet per minute relates to a 20-inch wide die head. Therefore flow rates for cubic feet per minute per inch of die head width are calculated by dividing the SCFM value by 20.) The resulting melt-blown fibers have an average size of about 5 to 6 microns (ranging from about 0.5 micron to about 10 microns), about the same as regular melt-blown fibers but the overall melt-blown web is more uniform than a conventional melt-blown web. As a result, while a conventional melt-blown web has a filter efficiency well below 70% at a pressure drop of about 0.1 inch of water, the improved melt-blown web, while having similar sized fibers, has efficiencies from about 95% to about 99.26% at pressure drops from about 0.25 to about 0.36 inch of water.

The improved melt-blown material can be further improved by cold calendering the improved melt-blown material at a pressure of from about 100 pounds per square inch to about 300 pounds per square inch. The resulting cold calendered melt-blown material when used as a filter medium has efficiencies from about 97.0% to about 99.57% with pressure drops from about 0.32 to about 0.65 inch. of water.

Other objects and advantages of the invention will become apparent upon reading the following detailed description.

DETAILED DESCRIPTION OF THE INVENTION

While the invention will be described in connection with the preferred embodiment and process, it will be understood that we do not intend to limit the invention to that embodiment or process. On the contrary, we intend to cover all alternatives, modifications, and equivalents as may be included within the spirit and scope of the invention as defined by the appended claims.

Figure 1:
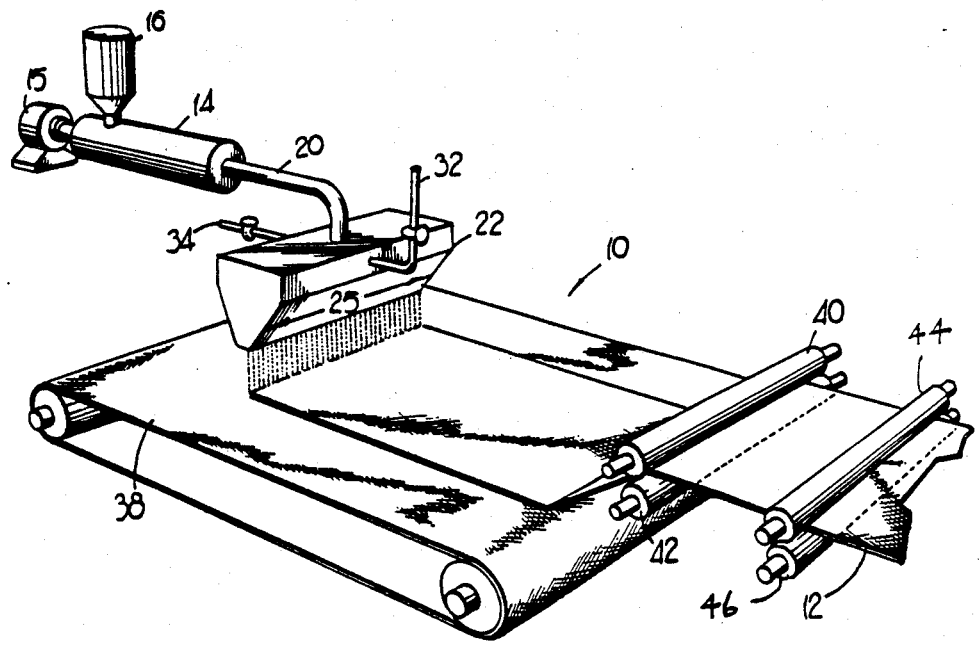
FIG. 1 is a schematic view of machinery for carrying the melt-blowing process of the present invention.
Figure 2:
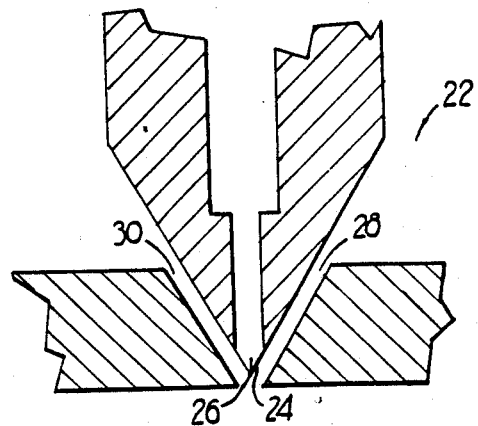
FIG. 2 is a detailed cross-section view of the die head of FIG. 1.

Turning to FIG. 1, there is shown machinery 10 for forming a melt-blown web 12. The machinery 10 includes an extruder 14 with a hopper 16 for receiving thermoplastic resin pellets. The extruder 14 includes an internal screw conveyor which is driven by a drive motor 15. The extruder 14 is heated along its length to the melting temperature of the thermoplastic resin pellets to form a melt. The screw conveyor, driven by motor 15, forces the thermoplastic material through the extruder into the delivery pipe 20 which is connected to a die head 22 having a die width 25. The die head 22, which is shown in cross-section in FIG. 2, comprises a die tip 24 which has a die opening or orifice 26 therein. Hot fluid, usually air, is supplied to the die tip via pipes 32 and 34 which terminate in channels 28 and 30 adjacent outlet 26 of the die tip.

As the thermoplastic polymer exits the die tip at opening 26, the high pressure air attenuates and breaks up the polymer stream to form fibers which are deposited on a moving foraminous belt 38 to form the web 12. A vacuum is drawn behind the foraminous belt 38 to draw the fibers onto the belt 38 during the process of melt-blowing. Once the fibers have been deposited on the moving belt 38, the web 12 is drawn from the belt 38 by rolls 40 and 42.

The foregoing description of the melt-blowing machinery 10 is in general conventional and well-known in the art. The characteristics of the melt-blown web 12 can be adjusted by manipulation of the various process parameters used in carrying out the melt-blown process on the melt-blowing machinery 10. The following parameters can be adjusted and varied in order to change the characteristics of the resulting melt-blown web:
1. Type of polymer,
2. Polymer through-put (pounds per inch of die width per hour—PIH),
3. Polymer melt temperature (°F.),
4. Air temperature (°F.),
5. Air flow (standard cubic feet per minute—SCFM),
6. Calendering pressure (tons or pounds per square inch),
7. Vacuum under forming belt (inches of water),
8. Distance between die tip and forming belt (inches).

Prior to the making of the present invention, the assignee of the present invention has been manufacturing a wiper material of melt-blown polypropylene which melt-blown wiper material is formed in accordance with the following process parameters:

EXAMPLE 1 (See Table 1)

| Polymer | Polypropylene |
|---|---|
| | PC973 - Himont USA, Inc., Wilmington, Delaware |
| Through-put | 4 to 5 PIH |

-continued

| | |
|---|---|
| Polymer Melt Temperature | 600° F. |
| Air Temperature | 550° F. |
| Air Flow | 100–150 SCFM |
| Calendering Pressure | 0 tons |
| Vacuum under forming belt | 7–10 inches of water |
| Distance to forming belt | 16 inches |

When melt-blown material manufactured in accordance with Example 1 is used as a filter medium, such melt-blown material provides an efficiency of approximately 18% and a pressure drop of less than 0.1 inch of water.

As previously stated, we have discovered that by varying the process parameters in the melt-blown process, an improved filter media exhibiting pre-HEPA filtering efficiencies can be produced. Such improved filter media result in general from lowering the through-put of the extruder from about 4 to 5 PIH to about 1 PIH and increasing the air flow from about 100 to 150 SCFM to about 250 to 325 SCFM. The improved melt-blown material exhibits efficiencies of from about 95% at a pressure drop of 0.25 inch of water (Example 14 below) to about 99.26% at a pressure drop of 0.36 inch of water (Example 7 below).

We have also discovered that further efficiency improvement can be achieved by cold-calendering the web 12 with pressures of from 100–300 pounds per square inch once the web 12 has been formed and removed from the forming belt. Cold calendering is accomplished by passing the web 12 through a pair of ambient temperature rollers 44 and 46. A person of ordinary skill can easily determine the calender roll pressure required to exert a particular pressure per square inch on the web. Cold calendering the improved melt-blown web produces filter media exhibiting efficiencies from about 97.0% at a pressure drop of 0.32 inch of water (Example 13 below) to about 99.57% at a pressure drop of 0.65 inch of water (Example 2 below).

The following Table 1, in addition to Example 1 (conventional melt-blown material), includes Examples 2 through 21 which examples illustrate process parameters and test results for various melt-blown filter media with filter efficiencies from 63.67% up to 99.57%.

TABLE 1

| EXAMPLE | POLYMER POLYPROPYLENE | BASIS WGT OZ/YD2 | PIH | AIR TEMP. °F. | MELT TEMP. °F. |
|---|---|---|---|---|---|
| 1 | PC973 | 2.00 | 4–5 | 550 | 600 |
| 2 | PC973 | 1.85 | 0.9 | 575 | 600 |
| 3 | PC973 | 1.85 | 0.9 | 575 | 600 |
| 4 | PC973 | 1.95 | 0.9 | 550 | 600 |
| 5 | PC973 | 1.85 | 0.9 | 575 | 600 |
| 6 | 3145 | 4 | 1 | 500 | 581 |
| 7 | PC973 | 1.95 | 0.9 | 550 | 600 |
| 8 | PC973 | 1.85 | 0.9 | 575 | 600 |
| 9 | PC973 | 1.95 | 0.9 | 550 | 600 |
| 10 | PC973 | 1.88 | 1 | 560 | 600 |
| 11 | PC973 | 1.95 | 0.9 | 550 | 600 |
| 12 | PC973 | 1.76 | 1 | 560 | 600 |
| 13 | 3145 | 2 | 1 | 500 | 581 |
| 14 | PC973 | 1.84 | 1 | 560 | 600 |
| 15 | 3145 | 2 | 1 | 543 | 600 |
| 16 | 3145 | 2 | 1 | 543 | 600 |
| 17 | 3145 | 2 | 1 | 543 | 600 |
| 18 | 3145 | 2.06 | 1 | 543 | 600 |
| 19 | 3145 | 2 | 1 | 500 | 581 |
| 20 | 3145 | 1 | 1 | 500 | 581 |
| 21 | XPF 011 | 1.89 | 1 | 517 | 474 |

The polypropylene resin PC973 is manufactured by Himont U.S.A., Inc. of Wilmington, Del., and the polypropylene resins 3145 and XPF 011 are manufactured by EXXON of Des Plaines, Ill.

TABLE 1 (Part 2)

| EXAMPLE | PRIMARY AIR FLOW SCFM | CALANDERED TONS | UNDERWIRE EXHAUST IN. W.G. | FORMING DISTANCE INCHES |
|---|---|---|---|---|
| 1 | 100–150 | 0 | 7–10 | 11–20 |
| 2 | 319 | 15 | 15 | 16 |
| 3 | 319 | 5 | 15 | 16 |
| 4 | 319 | 10 | 15 | |
| 5 | 319 | 10 | 15 | 16 |
| 6 | 150 | 15 | 7 | 11 |
| 7 | 319 | 0 | 15 | 10 |
| 8 | 319 | 0 | 15 | 16 |
| 9 | 319 | 10 | 15 | 10 |
| 10 | 282 | 0 | 15 | 20 |
| 11 | 319 | 10 | 15 | 10 |
| 12 | 282 | 10 | 15 | 20 |
| 13 | 150 | 15 | 7 | 11 |
| 14 | 282 | 0 | 15 | 20 |
| 15 | 145 | 10 | 5 | 11 |
| 16 | 145 | 10 | 5 | 11 |
| 17 | 145 | 10 | 5 | 11 |
| 18 | 145 | 0 | 5 | 11 |
| 19 | 150 | 0 | 7 | 11 |
| 20 | 175 | 0 | 7 | 11 |
| 21 | 310 | 0 | 13 | 7 |

The calendering was carried out on a 10-inch by 10-inch sample on a platen press. The calendering pressures measured in tons easily converts to pounds per square inch:
5 tons = 100 pounds per square inch
10 tons = 200 pounds per square inch
15 tons = 300 pounds per square inch The air flow is calibrated for a 20-inch wide die head and can be alternatively expressed as cubic feet per minute per inch of die head width by simply dividing each SCFM entry by 20 inches.

TABLE 1
(Part 3)

| EXAMPLE | DOP EFFICIENCY % | PRESSURE INCH W.G. | DOP FLOW RATE FPM | BUBBLE POINT uM |
| --- | --- | --- | --- | --- |
| 1 | 18 | | 10 | — |
| 2 | 99.57 | 0.65 | 5 | 20 |
| 3 | 99.47 | 0.49 | 5 | 20 |
| 4 | 99.45 | 0.46 | 5 | 20 |
| 5 | 99.45 | 0.51 | 5 | 20 |
| 6 | 99.4 | 0.63 | 5 | 28 |
| 7 | 99.26 | 0.36 | 5 | 23 |
| 8 | 99 | 0.35 | 5 | 29 |
| 9 | 98.13 | 0.95 | 10 | 20 |
| 10 | 98 | 0.29 | 5 | 31 |
| 11 | 97.96 | 1.5 | 15 | 20 |
| 12 | 97 | 0.32 | 5 | 20 |
| 13 | 96 | 0.29 | 5 | 20 |
| 14 | 95.23 | 0.25 | 5 | 32 |
| 15 | 95.2 | 0.27 | 5 | 20 |
| 16 | 95.06 | 0.53 | 10 | 20 |
| 17 | 95 | 0.98 | 15 | 20 |
| 18 | 93.13 | 0.19 | 5 | 25 |
| 19 | 87 | 0.16 | 5 | 20 |
| 20 | 70 | 0.1 | 5 | 20 |
| 21 | 63.67 | 0.13 | 5 | 29 |

As can be seen from Table 1, the filter media Examples 2 to 21 are arranged in order of filter efficiencies from highest (Example 2) to lowest (Examples 21).

Comparing Example 10 (98%) to Example 8 (99%) demonstrates the improvement in efficiency that results primarily from increasing the air flow from 282 SCFM to 319 SCFM.

Comparing Example 8 (99%) to Example 2 (99.57%) demonstrates the improvement in efficiency resulting from cold calendering.

Figure 3A:
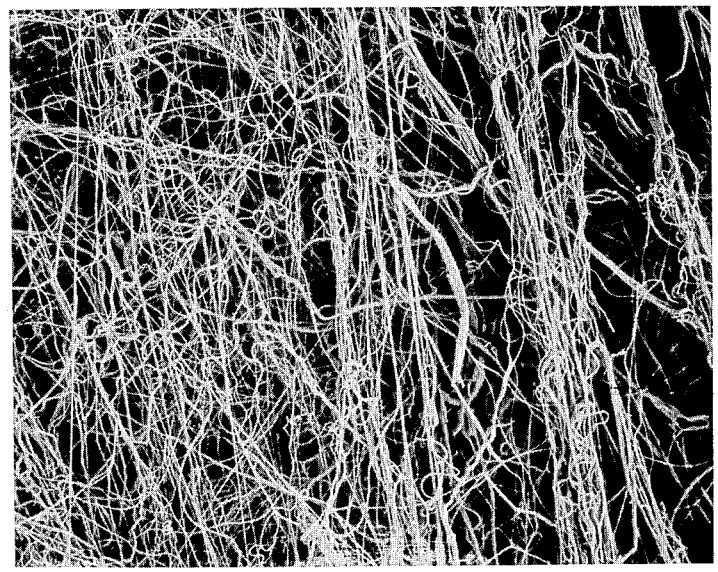
FIGS. 3A and 3B are micro-photographs showing the fiber structure of the improved melt-blown material (Example 7—no calendering) of the present invention.
Figure 3B:
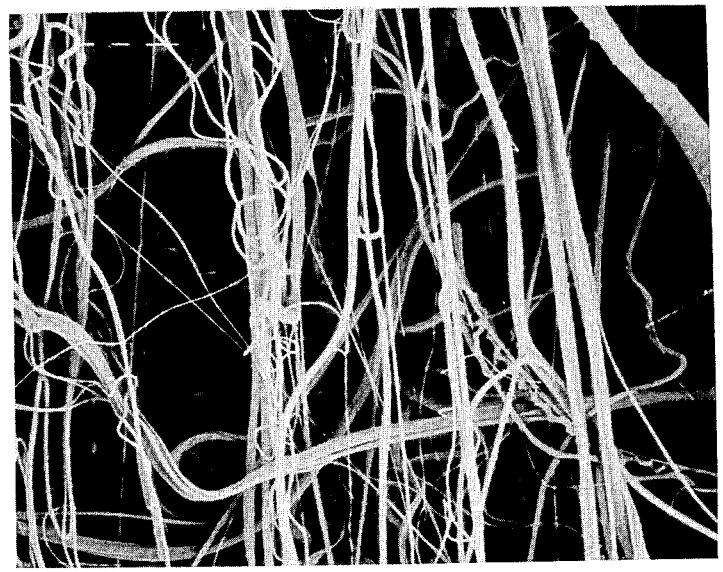

Turning to FIGS. 3A and 3B there is shown a microphotograph of the surface of the meltblown web of Example 7 photographed at magnification of 100× and 500× respectively. The microphotographs show the randomly entangled microfibers and the surface voids or surface pores between the entangled microfibers. Surface pores are defined as the voids between fibers at the surface of the material within the depth of field of the microphotographs which depth is from 10-15 microns. Observation of the microphotographs in FIGS. 3A and 3B indicates that the average fiber diameter is approximately 5 microns, although the fibers range from about 0.5 micron to about 10 microns. The larger surface pores appear to be in the order of 20 to 30 microns as indicated by observation and by the bubble point tests, in Table 1 (part 3). The material shown in FIGS. 3A and 3B exhibits an efficiency of 99.26% at a pressure drop of 0.36 inch of water.

Figure 4A:
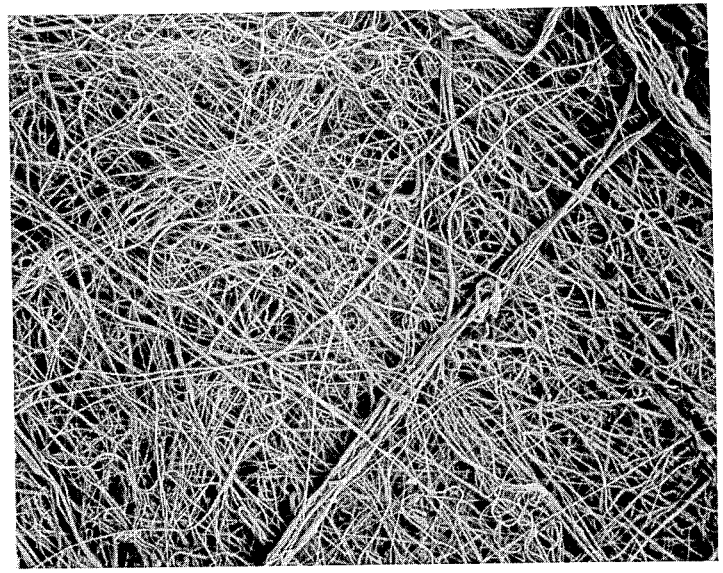
FIGS. 4A and 4B are micro-photographs of the improved melt-blown material (Example 4—calendered) of the present invention.
Figure 4B:
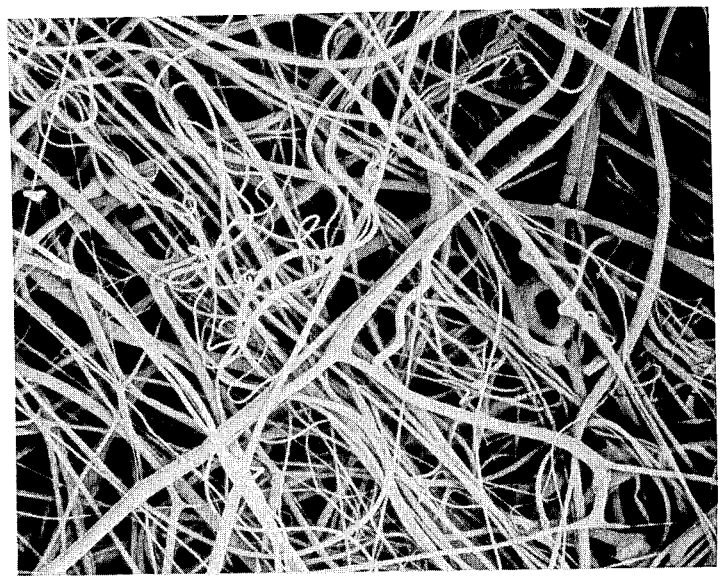

By contrast, FIGS. 4A and 4B show the surface of the melt-blown web of Example 4 at magnification of 100× and 500× respectively. While the average fiber size appears to be essentially the same as for Example 7 (FIGS. 3A and 3B), the surface pore size is greatly reduced as a result of the calendering which compacts the material in the Z direction thus providing a denser material with smaller surface pores. The smaller surface pores are apparently indicative of a reduction in pore size throughout the web's depth and an increase in the tortuousness of the flow paths, and thus the decrease in surface pore sizes appears to be related directly to increased efficiency of the material.

We claim:

1. A filter medium having an efficiency in the range of from about 97.0 to about 99.57 percent with a pressure drop in the range of from about 0.32 to 0.65 inch of water comprising a cold calendered web of meltblown polypropylene fibers, wherein the fibers have an average diameter of about 5 microns, and wherein the fibers are randomly oriented and spaced to define surface pores which are less than about 20 microns in size.

* * * * *

UNITED STATES PATENT AND TRADEMARK OFFICE
CERTIFICATE OF CORRECTION

PATENT NO. : 4,824,451

DATED : April 25, 1989

INVENTOR(S) : Clifford M. Vogt and Peter W. Shipp, Jr.

It is certified that error appears in the above-identified patent and that said Letters Patent is hereby corrected as shown below:

Column 3, line 52, "inch." should read --inch--;

Column 6, line 39, in Example 4, last column, blank space, should read --10--;

Column 7, line 28, "Examples" should read --Example--;

COlumn 8, line 12, "tests," should read --tests--.

Signed and Sealed this

First Day of June, 1993

Attest:

MICHAEL K. KIRK

Attesting Officer

Acting Commissioner of Patents and Trademarks